April 4, 1950     J. F. AYLEN     2,502,695
MACHINE FOR THE MANUFACTURE OF
CONTACT SPRINGS AND LIKE PARTS Filed Sept. 11, 1945     6 Sheets-Sheet 1

Inventor:-
John Frederick Aylen,
by
Pierce & Scheffler.
Attorneys.

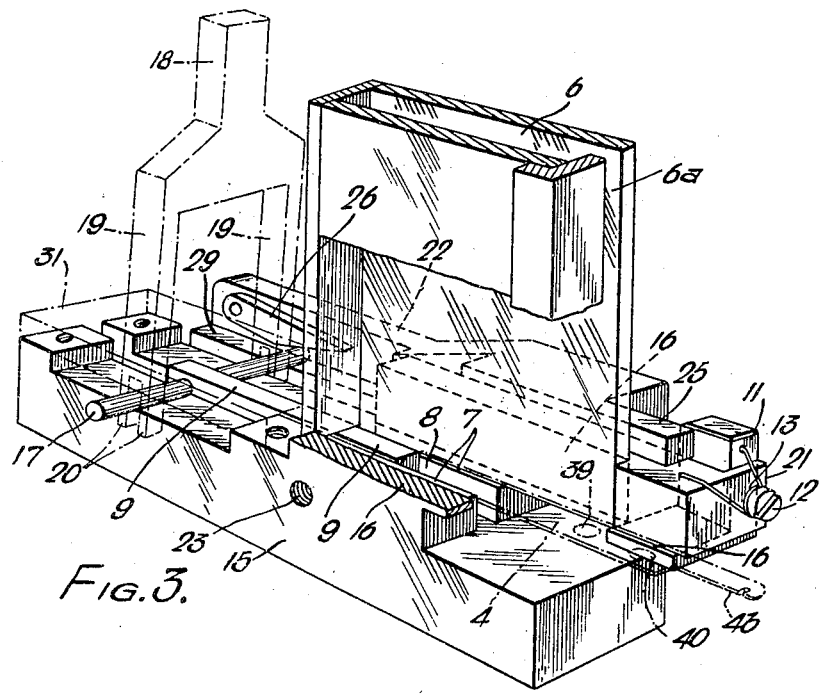
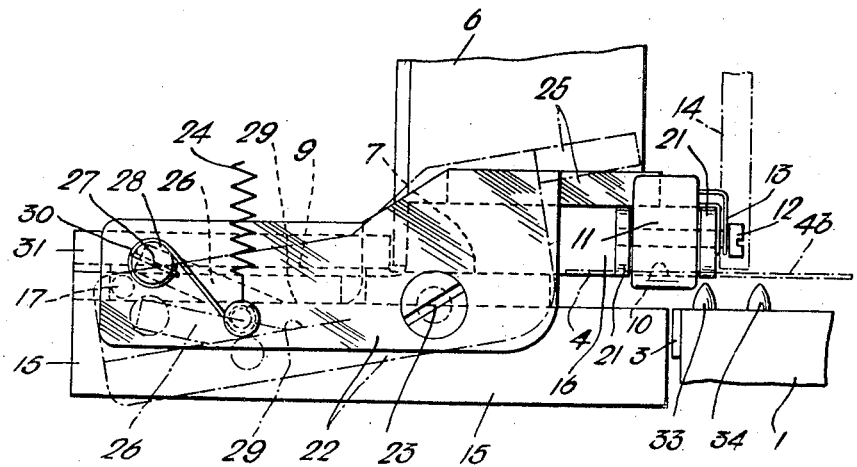

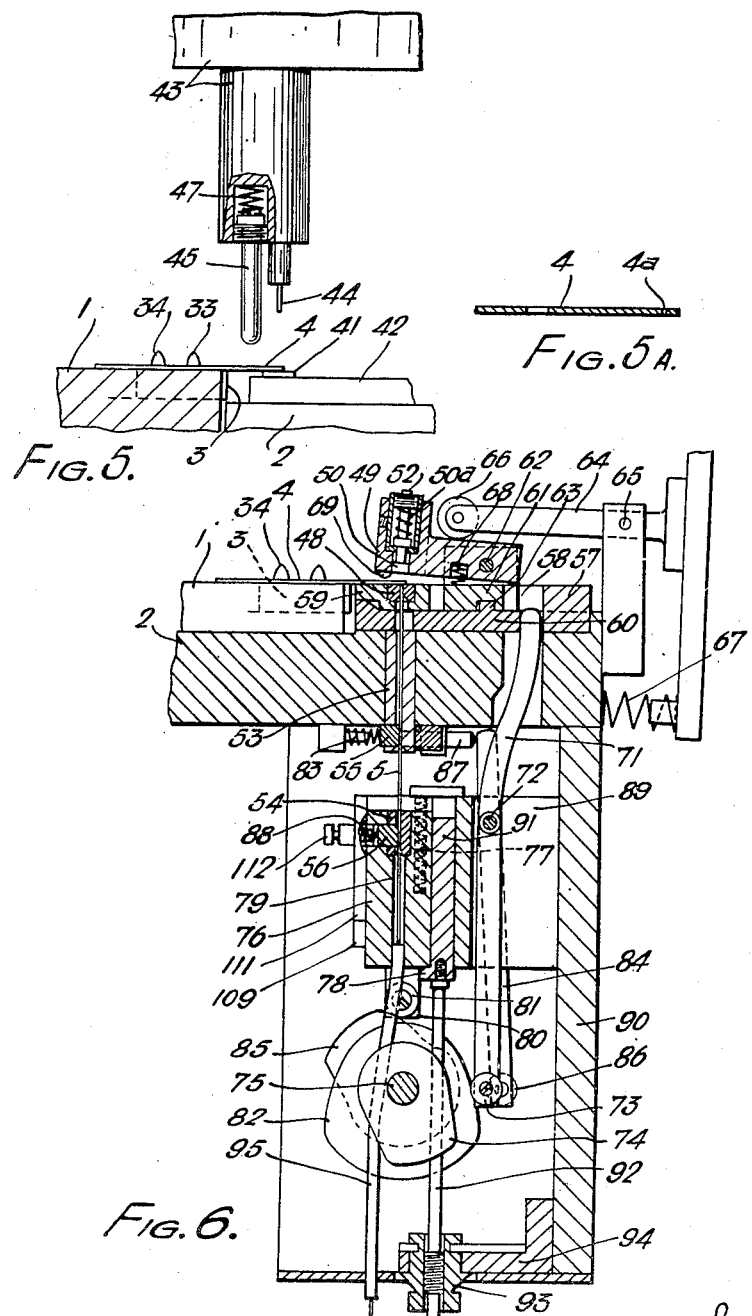

April 4, 1950            J. F. AYLEN            2,502,695
MACHINE FOR THE MANUFACTURE OF
CONTACT SPRINGS AND LIKE PARTS Filed Sept. 11, 1945            6 Sheets-Sheet 4

Inventor:-
John Frederick Aylen,
by Pierce-Scheffler,
Attorneys.

April 4, 1950 J. F. AYLEN 2,502,695
MACHINE FOR THE MANUFACTURE OF
CONTACT SPRINGS AND LIKE PARTS
Filed Sept. 11, 1945 6 Sheets-Sheet 5

Inventor:
John Frederick Aylen,
by Pierce & Scheffler
Attorneys.

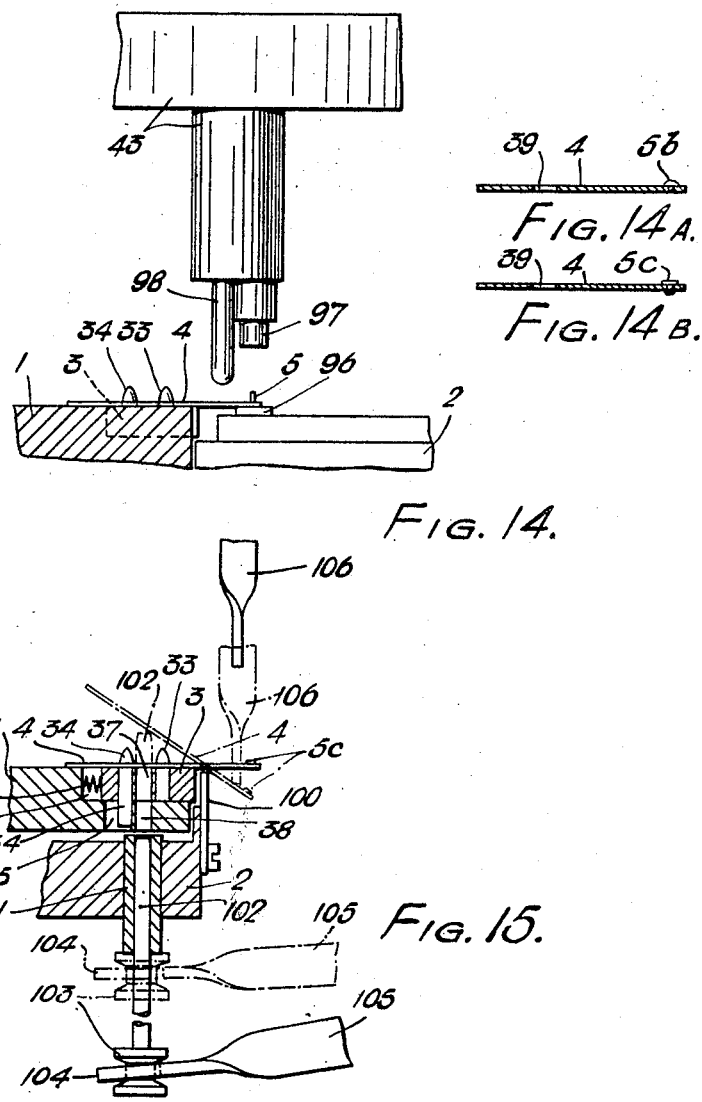

Patented Apr. 4, 1950

2,502,695

UNITED STATES PATENT OFFICE 2,502,695

MACHINE FOR THE MANUFACTURE OF CONTACT SPRINGS AND LIKE PARTS

John Frederick Aylen, London, England

Application September 11, 1945, Serial No. 615,572
In Great Britain August 3, 1944

Section 1, Public Law 690, August 8, 1946
Patent expires August 3, 1964

3 Claims. (Cl. 140—141)

This invention relates to apparatus for continuously cutting off pieces from a length of wire particularly, but not exclusively, for electrical contacts. The object of the invention is the provision of improved apparatus for this purpose. The invention consists broadly of apparatus comprising a die with a hole through it, means for feeding said length of wire through said hole intermittently in a step-by-step manner, a shearing element with a hole through it, and means whereby, during a period while the wire is being fed, said shearing element is located against the face of said die at the outlet side of the latter, in such a way that the hole in the shearing element registers with the hole in the die, so that the wire passes from the latter hole into the former, and during the subsequent interval while the wire is not being fed, said shearing element is moved across the face of said die, so that the hole in said shearing element moves out of registration with the hole in said die, whereby a piece is cut off from said length of wire.

In the case when each cut-off piece of wire is to be attached to a finger the shearing element itself constitutes one of the fingers, and means are provided whereby a succession of such shearing elements or fingers coact with said die, during successive periods of feeding and non feeding of the wire, so that each shearing element or finger cuts off the piece of wire which is to be attached to itself.

In this case each shearing element or finger retains in its hole the piece of wire which it has sheared off and said piece of wire without ever leaving said shearing element or finger is riveted in said hole. Thus a contact finger with a contact tip is provided.

In order that the invention may be the more clearly understood, a machine in accordance therewith will now be described, reference being made to the accompanying drawings, wherein:

Figure 3 is a perspective view of the magazine from which the contact springs are fed on to the turntable, with parts removed for clearness.

Figure 4 is a side elevation of said magazine.

Figure 5 is a section on line V—V of Figure 1.

Figure 5A is a section of the contact spring shown subsequently to the operation of Figure 5.

Figure 6 is a section on line VI—VI of Figure 1.

Figure 14 is a section on either of lines XIVA—XIVA or XIVB—XIVB of Figure 1.

Figure 14A is a section of the end of the contact spring after the operation of Figure 14 when considered as a section on line XIVA—XIVA of Figure 1.

Figure 14B is a section of the end of the contact spring after the operation of Figure 14 when considered as a section on line XIVB—XIVB of Figure 1.

Figure 15 is a section on line XV—XV of Figure 1.

Figure 1:
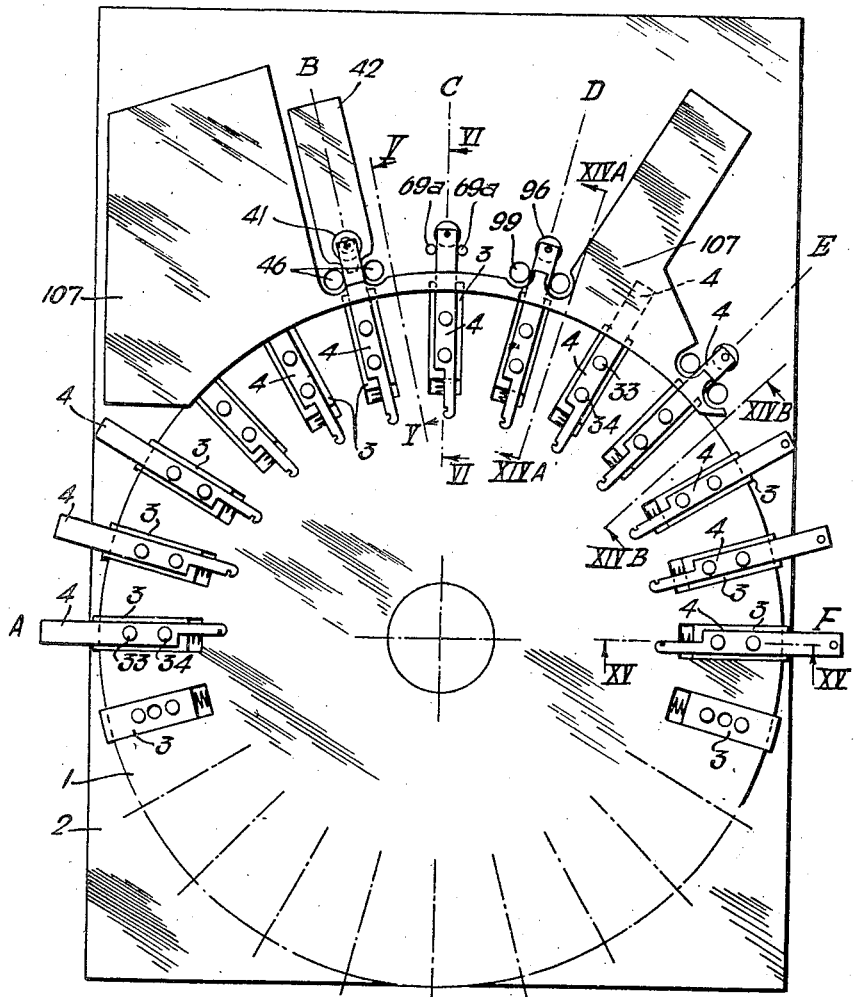
Figure 1 is a plan of the machine with the descending press head, the magazine and certain other parts omitted.

Referring to the drawings the machine comprises a turntable 1 mounted on a fixed base 2 and adapted to rotate clock-wise in a step-by-step manner through intervals equal to the distance apart of adjacent carriers 3 for the contact springs 4, which carriers 3 are mounted at intervals around the turntable.

Figures 10, 11A:
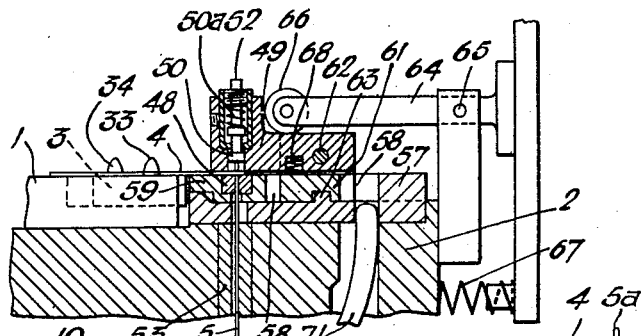
Figure 10 is a view of the upper part of Figure 6, the parts being shown at a later stage of the cycle.
Figure 11A is a section of the end of the contact spring subsequently to the operation of Figure 10.
Figure 11:
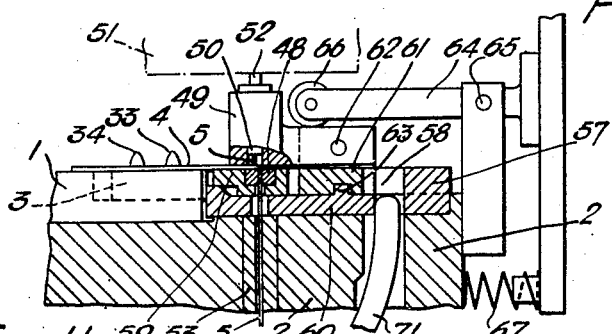
Figure 11 is a similar view to Figure 10 the parts being shown at a still later stage of the cycle.

Each time the turntable pauses after a step of movement, the following six operations are effected: First, by an operation illustrated by Figures 3 and 4, a contact spring 4 is fed on to that carrier 3 which is at the position A (Figure 1), so that said contact spring is thereafter carried round with the turntable. Second, by an operation illustrated in Figure 5, that contact spring 4 which is located at position B (Figure 1) has a small hole 4a punched in it near its end. Third, by operations illustrated in Figures 6, 7, 8, 9, 10 and 11, that contact spring 4 which is located at position C (Figure 1) has the upper end of a length of wire 5 first passed upwardly through the hole 4a of said contact spring, then sheared off and finally tapped hard enough to be slightly thickened and accordingly retained in said hole as at 5a (Figure 11A). Fourth, by an operation illustrated in Figure 14, that contact spring 4 which is located at position D (Figure 1) has its piece of wire riveted over as at 5b (Figure 14A). Fifth, by a similar operation which is equally illustrated in Figure 14, that contact spring 4 which is located at position E (Figure 1) has said piece of wire still further riveted over and flattened as at 5c (Figure 14B) to form the finished contact tip. Sixth, by an operation illustrated in Figure 15 that contact spring 4 which is located at F (Figure 1) is ejected from its carrier 3.

These several operations will now be separately described. They are all effected in proper synchronism with each other by power derived from a common prime mover. It has not been deemed necessary to describe fully the mechanisms connecting the prime mover with the individual devices by which these operations are performed, as many known types of mechanisms for this purpose will suggest themselves to any person skilled in the art.

First describing with reference to Figures 3 and 4, the operation of feeding a contact spring 4 on to that carrier 3 which is at the position A of Figure 1, the contact springs 4 are stacked one above the other in a vertical chute 6. Each contact spring 4 as shown in chain dotted lines in Figure 3, is a flat elongated spring with a reduced extension 4b at one end, and the chute 6, which extends upwardly from a point adjacent to the periphery of the turntable 1, is formed so as to accommodate the contacts one above the other, each horizontal, and with their extensions 4b projecting from the chute in a direction towards the turntable. Thus the chute 6 is, in sectional plan, generally in the form of a rectangle so as to be adapted to accommodate the main portion of the contact springs, and has a vertical slot 6a, in its wall nearest the turntable, through which the reduced extensions 4b of the contacts project.

Each contact spring, as it reaches the lowermost position rests with its two side edges supported on two fixed horizontal surfaces 7, and, at this position said contact spring is just clear of the end walls of the chute 6—that is the slotted wall closest to the turntable and the opposite wall furthest from said turntable—while being still retained against lateral movement by the two side walls of the chute. Said lowermost contact spring is the only one which is thus clear of the end walls of the chute 6.

The two fixed surfaces 7 are separated by a slot 8, and, longitudinally movable in said slot, is a pusher bar 9. Said pusher bar 9 is of such section that its uppermost surface is at a level above the surfaces 7, to the extent of the thickness, or just less than the thickness, of the contact spring 4, and, thus when said pusher bar 9 slides forwardly in said slot 8—that is from left to right according to Figures 3 and 4—its front end will engage the rear end of only the lowermost contact, and will slide said lowermost contact forwardly. This forward sliding operation of said pusher bar is the first operation after the turntable 1 comes to rest at a new position.

Each contact spring when it first reaches the lowermost position, overhangs the two surfaces 7 forwardly and the forward end of the main portion of said contact spring is also supported at its two side edges on two surfaces 10. These surfaces 10, only one of which is seen in Figure 3, because parts are broken away for clearness, are surfaces on elements 11 (only one shown in Figure 3) which are mounted so as to be capable of pivoting about horizontal axis 12, parallel to the contacts and spaced from each side thereof, in such a direction that said surfaces 10 can move on arcs downwardly and away from each other. At the moment however when each contact spring first reaches its lowermost position said elements 11 are locked against pivotal movement so that the surfaces 10 form fixed supporting surfaces.

When the bar 9 slides forwardly in the slot 8 from its normal position it slides the lowermost contact spring forwardly to such an extent that the rear end of said contact spring is clear of the fixed supporting surfaces 7, and said contact spring is thus supported solely by said surfaces 10. The position of the contact spring is now as shown in Figure 4. The pusher bar 9 then slides rearwardly and, in so doing, it automatically releases the elements 11 so as to permit them to move their surfaces 10 downwardly and outwardly as before described. Said elements 11 are now retained at their normal position solely by respective springs 13.

The contact spring 4 is now immediately above that carrier 3 which is at position A, and is supported solely by the now yielding surfaces 10. A vertical plunger 14 now descends upon the contact spring and presses it downwardly, causing the surfaces 10 to move downwardly and apart so that said contact spring passes between them and comes to rest on its carrier 3. The elements 11 now snap back to their normal position and the plunger 14 ascends, and the contact spring is left on its carrier 3.

Just after this, the pusher bar 9 reaches its rearmost or normal position and the elements 11 are again automatically locked.

More particularly, each of the fixed surfaces 7 is formed on a base block 15 which is secured to the lowermost end of the chute 6. The securement of said base block 15 to said chute is effected by means of screws, not shown, which pass through side flanges 16 of said base block and into the side walls of said chute. Said side flanges 16 upstand integrally from said base block. The nearest one of them is shown broken away in Figure 3.

The slot 8 extends back rearwardly to the rear end of the base block 15 which as shown is well to the rear of the chute. At its rear end said pusher bar 9 has a rod or pin 17 passing horizontally through it and extending at each end beyond the sides of the base block, the upper surface of said base block being cut away as shown to accommodate said rod or pin 17 throughout the whole of the stroke of the pusher bar. The reciprocating movement of said pusher bar 9 is imparted to it through the medium of a rocking lever 18 whose lower end is bifurcated, as shown in Figure 3, with the two branches 19 straddling the base block 15, the end of each of said branches 19 being again bifurcated with the two sub-branches 20 of each branch 19 straddling each end of the rod or pin 17.

The two elements 11 are each of L form as best shown in Figure 3 and each one has a normally upright arm which is pivoted on the axis 12 between two lugs 21 extending from the respective side flange 16, and a normally horizontal arm which extends inwards and whose extremity provides the surface 10. This horizontal arm of each element 11 extends underneath the respective side flange 16, which, as shown, is cut away for that purpose, and the said extremity of said horizontal arm extends just beyond the inner surface of said side flange 16 as shown. Said side flange 16 is stepped as shown so that over the region forwardly of the chute 6 the said inner surface of said side flange is in the same plane as the inner surface of the adjacent side wall of the chute, and thus the said inner surface of said side flange helps to locate the contact spring in respect of lateral movement. Each spring 13 biases said element 11 to its normal or supporting position at which its horizontal arm presses up against the cut away under surface of the side flange 16.

For locking said elements 11 at their normal positions, levers 22 are pivotally mounted on the sides of the base block 15, so as to be capable of rocking about a horizontal transverse axis 23 between their ends. These levers are biased upwardly at their rear ends by means of springs 24 (Figure 4), and, at their forward ends, they have forward projections 25 which normally, under the influence of said springs 24, are at a limiting down position at which they rest on the upper surfaces of the respective side flanges 16 with their extremities just inside the respective upright arms of the elements 11. Thus said elements 11 are normally positively locked at the supporting position.

The unlocking of said elements 11 is effected by means of the transverse rod or pin 17 in co-operation with pawls 26 mounted on the respective levers 22. These pawls 26 are pivotally mounted on the inner surface of the respective levers 22, so that they pivot at their rear ends about a common transverse horizontal axis 27 near the rear ends of said levers 22. Thus each pawl has a short pivot axis rigid thereon which passes through the respective lever 22 to the outside where said axle carries an enlarged head 28.

The inner surface of each lever 22 is formed with an upward ledge 29 at a level beneath the pawl 26 and the pawl is biased downwardly about its axis so that its forward end, which comes to a point as shown, presses down upon this ledge 29. This bias is afforded by means of a spring 30 coiled about the head 28.

It should be mentioned that during its reciprocatory movement the unit comprising the pusher bar 9 and rod or pin 17 is kept down on the base block 15 by means of a cover plate 31 screwed down on said base block. The transverse rod or pin 17 terminates at each end just inside the inner surface of the respective lever 22 and above the ledge 29, and, when said rod or pin is at its normal or rearmost position its ends are behind and beneath the rear ends of the pawls 26. When said rod 17 moves forwardly, its ends pass underneath the pawls 26 and raise their forward ends in opposition to the spring bias as shown in Figure 3, until, as said rod moves into its forward limit, its ends pass the forward extremities of said pawls and the latter snap down again with their forward extremities on the ledge 29. When now the rod 17 moves rearwardly its ends will be unable to pass under the forward extremities of the pawls 26 but will slide over the upper surfaces of said pawls, and this will force the rear ends of the levers 22 downwardly so that the extensions 25 at the forward ends of said levers will move upwardly clear of the upper ends of the upright arms of the elements 11, and said elements 11 will accordingly be released for rocking in opposition to their springs 13 for releasing the spring contact 4 as previously described. As said rod 17 moves into its rearmost position it passes the rear ends of the pawls 26 and the levers 22 are accordingly enabled to spring back to their normal positions. By that time, the spring contact 4 has been liberated from the elements 11 and the latter has returned, under the bias of their springs 13 to the normal position.

Figure 2:
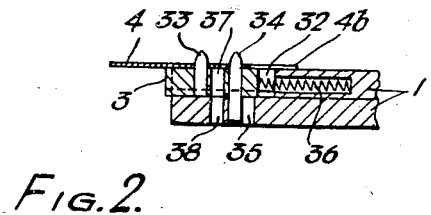
Figure 2 is a fragmentary sectional side elevation showing the manner in which the contact spring is mounted on the turntable.
Figure 7:
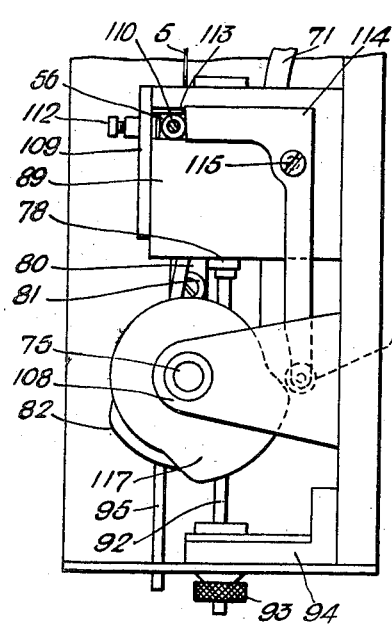
Figure 7 is an outside elevation of the lower part of Figure 6.
Figure 8:
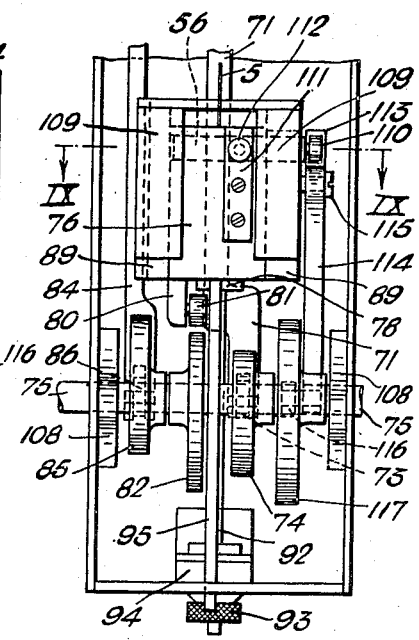
Figure 8 is an elevation looking from the left of Figure 7.
Figure 9:
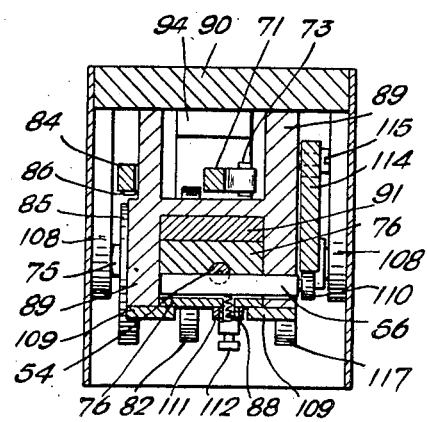
Figure 9 is a section on line IX—IX of Figure 8.

As best shown in Figure 2, each of the carriers 3 consists of a rectangular block of metal a little wider than the contact spring 4. Said carrier 3 is slidable in a radial slot 32 in the turntable 1, which slot extends to the circumferential edge of said turntable. The upper surface of said carrier is flush with the upper surface of said turntable. Said carrier has two posts 33 and 34 mounted thereon at spaced points along its centre line. The posts both stand up from the upper surface of said carrier, and the post 34 also extends down from the lower surface of said carrier so as to engage in a small radial slot 35 extending from the bottom of the slot 32. The co-operation of the post 34 and the ends of the slot 35 determine the limits of reciprocation of the carrier. Said carrier is biased outwardly by means of a spring 36 to its outward limit where it slightly overhangs the outer periphery of the turntable 1 as shown. This is the normal position of said carrier, and at this position, a central hole 37 in the carrier registers with a hole 38 through the turntable 1 to the underside thereof, for a purpose which will be described hereinafter.

The contact spring 4 is formed with two holes 39 and 40 (Figure 3) and before being pressed down by the plunger 14, said contact spring is located with these two holes immediately above the upper side of the posts 33 and 34 which are pointed as shown. When therefore the spring 4 is pressed down by the plunger 14, these holes 39 and 40 slide over the posts 33 and 34 and said spring is correctly located on the carrier 3, and will be carried round with it as the turntable rotates.

Next describing, with reference to Figure 5, the operation of punching the hole 4a into that contact spring 4 which is at the position B of Figure 1, the outer end of said contact, which, as shown, overhangs the circumferential periphery of the turntable 1, is, at the said position B, located over a small die 41, with a central perforation therein, mounted on a raised part 42 on the fixed base 2. When the turntable 1 has come to rest, a press head 43 thereabove descends and a piercing tool 44 carried by said press head passes through the spring 4 into the central hole in the die 41, thereby punching the hole 4a.

Depending down from the press head 43 are two guide posts 45. The lower ends of these are rounded and, before the tool 44 pierces the spring 4, these guide posts pass one each side of said spring and thereby ensure that it is located with complete accuracy. These guide posts 45 enter holes 46 (Figure 1) in the fixed base 2. Said guide posts 45 are capable of yielding upwardly in opposition to springs 47 in order that no damage can be done if foreign matter inadvertently becomes located in either of the holes 46, or if the spring to be pierced is accidentally displaced to a considerable extent.

Next describing, with reference to Figures 6, 7, 8, 9, 10 and 11 the manner in which that contact spring 4 which is located at position C has a length of wire 5 fixed in its hole 4a, the outer end of said contact is, at the said position C, located with its hole 4a immediately over, and in registration with, a central vertical hole through a small die 48 which is fixed with respect to the base 2. Immediately after the turntable comes to rest, the wire 5 is fed upwardly from below, through the hole in said die 48 and the hole 4a in the contact spring, until a given length of the wire 5 projects upwards above said contact spring. Next an element 49 descends on to the contact spring 4 and holds it firmly down. The element 49 has a vertical hole in its under surface in which reciprocates a plunger head 50 which is biased by means of a spring 50a to a limiting down position (Figure 6) at which it is flush with the under surface of said element 49. When the element 49 descends, the under surface of the plunger head 50 engages the upper end of the spring 5 and said head 50 is thereby pressed up in opposition to its bias. Said head 50 has a small recess 50b (Figure 12) on its under side in which the end of the wire engages. The position is now as in Figure 10.

Next a simultaneous movement in the direction towards the centre of the turntable 1 (i. e. to the left according to Figures 6, 7, 10 and 11) is imparted to both the carrier 3 (and therefore the contact spring 4) and the element 49. This causes the contact spring 4 itself to shear off the wire 5 in the plane of the under surface of said contact spring, and the sheared off upper end of the wire is moved to the left with the contact spring. The position is now as in Figure 11.

Next an element 51 descends and lightly taps the upper end of the plunger 52 which carries the head 50, and this forces the lower end of the sheared-off portion of the wire 5 against the upper surface of the die 48 and enlarges the said lower end sufficiently to cause it to tighten in the hole 4a.

Next the carrier 3 and the element 49 are returned simultaneously to the position of Figure 10 and finally said element 49 is raised to the position of Figure 6. All is now ready for the turntable to make its next step of movement, thereby carrying to the next position the contact spring 4 with the length of wire 5 attached to it.

·For effecting the step-by-step upward feeding of the wire 5 through the hole 4a in the contact spring 4, the wire 5 passes through an axial hole in a fixed bush 53 mounted in the base 2 a little beneath the die 48. Said wire some distance beneath said bush 53 passes through an axial hole in another bush 54. The bush 53 has a cut away opening in its side which breaks into the axial hole, and a clamping pad 55 is located in this opening in such a way as to be capable of reciprocating radially with respect to the axial hole. The bush 54 has a similar opening which breaks into the axial hole, and in this opening a clamping pad 56 is located which is also reciprocatable radially.

In operation the bush 54 is continuously reciprocated in a direction axially of its hole. While it is making its up stroke the clamping pad 56 is pressed inwardly so as to clamp the wire 5 in said bush 54, and, at the same time the clamping pad 55 is moved slightly outwards so that it leaves the wire 5 free to pass through the bush 53. When therefore the bush 54 makes its up stroke, the wire is fed one step. While the bush 54 is making its down stroke the clamping pad 56 is moved slightly outwards so as to release the wire 5 from said bush 54, and, at the same time, the clamping pad 55 is pressed inwardly so as to clamp the wire 5 in the bush 53. When therefore the bush 54 makes its down stroke the wire 5 is held stationary.

Describing now certain constructional and operational details of Figures 6 to 11, the fixed base 2 has mounted on it a block 57 one of whose ends (the left hand end in the drawings) is very close to the outer end of the carrier 3. This block 57 is formed with a straight sided slot 58 extending into it from its said left hand end in a direction radially with respect to the turntable 1 (i. e. to the right in the drawings). This slot extends through said block 57 from top to bottom, thereby exposing the upper surface of the base 2. The die 48 is mounted in a bridge element 59 which bridges the slot 58 leaving a space underneath. Lying slidable in the bottom of said slot 58 is a pusher element 60, which, at the left hand end is underneath the bridge element 59, an element 61 is slidably mounted in the slot 58 to the right of the bridge element 59, and resting on the pusher element 60, and, pivotally mounted on this element 61, so as to pivot about the axis 62, is the aforesaid element 49, the arrangement being such that said element 49 descends, as heretofore described, by rotation about said axis 62. Said pusher element 60 has an upstanding projection 63 which engages in a corresponding recess in the element 61, the recess being slightly larger than the projection so as to give the pusher element 60 a small play relative to the element 61 in a direction longitudinally of the slot 58.

Said pusher element 60 is adapted to be reciprocated in the slot 58, as will be hereinafter described. When it reciprocates to the left, it first moves a very small distance free, and then, simultaneously, its left hand end engages the outer end of the carrier 3, and its projection 63 picks up with the element 61, and thus the carrier 3 and the element 61 are simultaneously moved to the left, or, in other words, as heretofore stated, the contact spring 4 and the element 49 are simultaneously moved to the left for shearing off the upper end of the wire.

Reciprocation of the pusher element to the right will of course return the carrier 3 and the element 61 to their original positions.

The upward and downward movement of the element 49 about the axis 62 is effected by means of a lever 64 which pivots about a fixed axis 65 and carries at one end a roller 66 which rests on a surface of said element 49. Said lever 64 is biased by means of a spring 67 about the axis 65 in such a direction that the roller 66 presses said element 49 to the down position. When said element 49 is to return to the up position said lever 64 is rocked by means not shown in the other direction and a light spring 68 is free to raise said element to its up position.

Figures 12, 13:
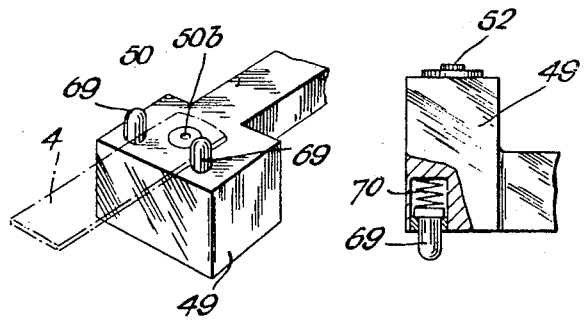
Figure 12 is an inverted perspective view of a fragment of any of Figures 6, 10 or 11.
Figure 13 is a side elevation, shown partly in section, of the same.

As best shown in Figures 12 and 13 the element 49 has two downwardly depending locating pins 69, which, in a manner similar to the pins 45 hereinbefore described, pass each side of the spring contact 4 when said element 49 descends, and thereby ensure that said contact 4 is accurately located. Like the pins 45, these pins 69 enter holes 69a (Figure 1) which, in this case, are in the bridging element 59 and are capable of yielding in opposition to springs 70.

The reciprocatory movement of the pusher element 60 is effected through the medium of a lever 71 which passes up from underneath the base 2, through a hole in said base, and into the slot 58 and whose upper end engages the left hand end of said pusher element. Said lever 71 pivots between its ends on a rod or pin 72, and it will be seen that, when said lever rocks in a counterclockwise direction, it pushes the pusher element 60 positively to the left. When said lever 71 rocks in a counterclockwise direction, the pusher element 60 is returned to the right by means of a spring not shown. Said lever carries a roller 73 at its lower end and is rocked by means of a cam 74 mounted on a rotating shaft 75, which cam engages said roller.

To effect the aforesaid vertical reciprocation of the bush 54 the latter is rigidly mounted in a slide block 76 which is vertically reciprocatable and is downwardly biased by means of a spring 77 to a limiting down position determined by a stop 78. The wire 5 passes through a hole 79 in said slide block 76. Said slide block 76 at its lower end has a downwardly projecting lug 80 which carries a roller 81, and the reciprocation of said slide block is effected by a cam 82, (mounted on the aforesaid shaft 75) engaging said roller 81. The vertical position of the stop 78 can be accurately adjusted, as will be hereinafter described, and thus the length of stroke of said slide is accurately adjusted and therefore the length of wire 5 which is sheared off and attached to each contact spring 4.

The clamping pad 55 is permanently biased inwardly by means of a spring 83, as will be clear from the drawing, with sufficient force to clamp the wire in the bush 53. For moving said pad outwardly, when it is required to free the wire as heretofore described, a lever 84, which pivots about the aforesaid pin 72, is rocked in a counterclockwise direction by means of a cam 85 which engages a roller 86 on the lower end of said lever 84. The upper end of said lever 84 then engages the end of a longitudinally reciprocatable rod 87 which is in rigid relation to said pad 55, and thereby said pad 55 is moved to the left in opposition to its spring 83. The general construction and mounting of the pad 55 is similar to the pad 56 which will be now more fully described hereinafter.

In construction, the pivot pin 72 extends between, and is supported by two side blocks 89 which extend from a massive back block 90 which depends downwardly from the fixed base 2. The shaft 75 bears in two bearing members 108 which are also mounted on said back block 90.

The slide block 76 slides between the two side blocks 89 and is further guided by a member 91 extending between said side blocks behind it, and two plates 109 mounted on the respective side blocks in front of it. The stop 78 is formed integrally with the member 91, and said element 91 is vertically adjustable relative to said side blocks 89.

Thus said element 91 is secured to the upper end of a vertical rod 92 whose lower end is in screwed engagement with a rotatable milled and calibrated nut 93 which rotates in but is incapable of axial movement relative to, a member 94 mounted on the back block 90. Thus by rotating the nut 93, the level of the stop 78 may be adjusted and therefore as hereinbefore described, the lengths of wire 5 sheared off.

It will be observed that the wire 5, throughout the region where it passes close to the cams, passes through a flexible tubing 95 which guides and protects it, said flexible tubing being connected at its upper end to the slide block 76 and at its lower end to a fixed part.

The pad 56 takes the form of a bar which passes through a hole in the slide block 76 from side to side and also continues through a hole in one of the side blocks 89 to the outside where it carries a roller 110. At its other end said pad bears against the face of the other side block 89.

The outer surface of the slide block 76 has a small hole passing to the hole which contains the pad 56, and in this small hole is located a spring 88. A small plate 111 is mounted on the outer face of the slide block 76, and said plate 111 has a tapped and bossed hole which registers with said spring 88, and a screw 112 operates in said hole so as to be capable of varying the pressure of the spring.

The hole which contains the pad 56 permits a very slight outward movement of said pad from the position where it presses the wire under the influence of the spring 88 but it permits no up and down movement of said pad relative to the slide 76. For moving said pad 56 outwardly at the appropriate moment in opposition to the spring 88 so as to liberate the wire from the bush 54 as before described, the roller 110 coacts with the end surface 113 of a bell crank lever 114 which pivots about a pivot pin 115 mounted on one of the side blocks 89. The other end of said bell crank lever 114 carries a roller 116 which is actuated by a cam 117 mounted on the aforesaid shaft 75. It will be appreciated that owing to the small reciprocatory movement of the slide block 76, the roller 110 rolls along the surface 113. When said roller 110 is pressed outwardly by the lever 114 it will be understood that the pad 56 will fulcrum at its end remote from the roller.

Describing now, with reference to Figure 14, the manner in which that contact spring 4 which is located at position D has the length of wire 5, which is now fixed to it, riveted over as at 5b, the outer end of said contact spring 4 is, at said position D, located with the length of wire 5 immediately over a small anvil 96 mounted on the fixed base 2. When the press head 43 descends, upon the turntable 1 coming to rest, a riveting tool 97 presses on the upper end of said wire 5 and domes it as indicated at 5b (Figure 14A). Two guide posts 98 function in the same way as the guide posts 45 of Figure 5 to locate the spring 4 accurately with the wire 5 under the centre of the tool 97. The reference 99 designates the holes in the base 2 in which said guide posts 98 enter.

The operation which takes place at position E is similar to that at position D and is equally illustrated by Figure 14. By this operation the rivet head is flattened as at 5c (Figure 14B) and the contact tip is now completed. In the case of this operation, the stake underneath the lower end of the wire is slightly hollowed to enable the metal of the wire to bulge and spread on the under side, as shown in Figure 14B, thereby firmly and permanently securing the now formed contact tip to the contact spring 3.

Describing now, with reference to Figure 15, the final operation of ejecting the contact spring 4 from the machine, when said contact spring reaches position F, the end of said spring, which projects from pad 3 and turntable 1 overhangs a fixed vertical plate 100 which projects up from the base 2 and has its upper edge just beneath said contact spring close to the outer end of the carrier 3. Also, the aforedescribed holes 36 and 37, through the turntable 1 and the carrier 3 respectively are in line with a vertical bore hole of a bush 101 mounted in the fixed base 2 underneath the turntable as shown. In the bore hole of this bush is slidably located an ejection rod 102. At its lower end beneath the bush, said ejection rod has mounted on it a head 103 formed with a reduced neck as shown, and the branches 104 at the bifurcated end of a lever 105 straddle said reduced neck. When the head 43 descends subsequently to the turntable coming to rest, two operations simultaneously take place, that is to say, the bifurcated end 104 of the lever 105 moves upwardly to the position shown in chain dotted lines, thereby moving the ejection rod 102 upwardly to the position shown in chain dotted lines and lifting the spring 4 clear of the posts 33 and 34, and simultaneously a rod 106 carried by the head descends on to the overhanging end of the spring 4, to the position shown in chain dotted lines. The result of these two operations is that the spring 4 pivots about the upper edge of the plate 100 through the position shown in chain dotted lines, and thence is ejected clear of the machine into a suitable container.

The reference 107 (Figure 1) designates a U-shaped plate which covers and holds down the contact springs 4 over all the positions at which operations take place.

I claim:

1. In an automatic machine for forming contact fingers, the combination comprising, an indexable turntable having a plurality of radially extending and circumferentially spaced carriers each adapted to receive and support a contact finger one end of which projects beyond the periphery of the turntable, each of said carriers being movable in a radially inward direction against a loading spring, and a work station located adjacent the periphery of said turntable, said station including a stationary die having one face thereof substantially in surface contact with an adjacent face of the projecting end of a finger brought into alignment therewith by the index action of said turntable, said die including a passageway for wire therethrough in registry with a contact hole in the finger, means feeding a predetermined length of said wire through said die and said contact hole to upstand from the finger, and cam operated means associated with said die and wire feed means engageable with said finger carrier to shift the latter and the finger carried thereby radially inward against said loading spring to thereby shear off the wire at the die face.

2. An automatic machine as defined in claim 1 and which further includes a member engageable with the free end of said wire prior to shearing of the latter, and means for displacing said member simultaneously with and in the same direction as said carrier to thereby support said wire end during the shearing operation.

3. In an automatic machine for forming contact fingers, the combination comprising, a turntable, a plurality of radially extending and circumferentially spaced finger carriers on said turntable adjacent the periphery thereof, each of said carriers being movable in a radial direction and including means for holding one of the fingers in fixed relation thereto, said turntable being rotatable upon its axis in a step-by-step manner to bring each of said carriers into a position of dwell at each of a plurality of work stations in succession, one of the stations including a stationary die having one face thereof substantially in surface contact with an adjacent face of the finger positioned thereat, said die including a passageway for wire therethrough in registry with a contact hole in the finger, means actuated during each dwell period of said turntable for feeding a predetermined length of contact wire through said die and said contact hole to upstand from the finger, and means for then shifting the carrier for that particular finger radially to thereby shear off said wire at the face of said die.

JOHN FREDERICK AYLEN.

REFERENCES CITED

The following references are of record in the file of this patent:

UNITED STATES PATENTS

| Number | Name | Date |
|---|---|---|
| 129,572 | Libby | July 16, 1872 |
| 378,805 | Richards | Feb. 28, 1888 |
| 447,541 | Eberhardt | Mar. 3, 1891 |
| 589,595 | Draher | Sept. 7, 1897 |
| 717,706 | McCool | Jan. 6, 1903 |
| 1,467,536 | Dornier | Sept. 11, 1923 |
| 1,731,441 | Schane | Oct. 15, 1929 |
| 2,052,356 | Long | Aug. 25, 1936 |
| 2,121,655 | Elsey et al. | June 21, 1938 |

FOREIGN PATENTS

| Number | Country | Date |
|---|---|---|
| 471,259 | Great Britain | Sept. 1, 1937 |
| 523,455 | Great Britain | July 15, 1940 |